United States Patent [19]

Kahn

[11] 4,206,317
[45] Jun. 3, 1980

[54] REDUCTION OF ADJACENT CHANNEL INTERFERENCE

[76] Inventor: Leonard R. Kahn, 70 N. Grove St., Freeport, N.Y. 11520

[21] Appl. No.: 836,544

[22] Filed: Sep. 26, 1977

Related U.S. Application Data

[62] Division of Ser. No. 764,476, Jan. 31, 1977, abandoned.

[51] Int. Cl.² ............................ H04B 1/10; H04B 1/68
[52] U.S. Cl. .................................. 179/1 GS; 455/311
[58] Field of Search ..................... 179/15 BT, 1 GS; 325/36, 427, 467, 473, 474, 476, 477, 49, 50

[56] References Cited

U.S. PATENT DOCUMENTS

| | | | |
|---|---|---|---|
| 2,835,889 | 5/1958 | Dyer et al. ..................... | 179/15 BT |
| 3,218,393 | 11/1965 | Kahn ............................... | 179/15 BT |
| 3,311,833 | 3/1967 | Lewis et al. .................... | 179/15 BT |
| 3,707,603 | 12/1972 | Limberg .......................... | 179/15 BT |
| 3,908,090 | 9/1975 | Kahn ............................... | 179/15 BT |
| 3,919,482 | 11/1975 | Hamada ........................... | 179/15 BT |
| 3,944,749 | 3/1976 | Kahn ............................... | 179/15 BT |
| 3,973,203 | 8/1976 | Kahn ............................... | 179/15 BT |
| 4,018,994 | 4/1977 | Kahn ............................... | 179/15 BT |
| 4,042,782 | 8/1977 | Worcester ....................... | 179/15 BT |

OTHER PUBLICATIONS

"Radio Receiver Design" by K. R. Sturley, 1953, John Wiley & Sons Inc., pp. 517, 518, 543-545 & 548-550.

*Primary Examiner*—Douglas W. Olms

[57] ABSTRACT

An improved system and method for reducing adjacent channel interference in radio systems by making use of the so called "cocktail party effect". Also, the selectivity is improved by measuring the level of adjacent channel interference above and below the desired channel and automatically changing selectivity characteristics of the receiver in accordance with the measured interference.

The system is particularly applicable to the reception of AM Stereo signals but it may also be used to improve the performance of monophonic systems.

17 Claims, 3 Drawing Figures

REDUCTION OF ADJACENT CHANNEL INTERFERENCE

This is a Division of application Ser. No. 764,476, filed Jan. 31, 1977, now abandoned.

BACKGROUND OF THE INVENTION

While the invention is subject to a wide range of applications, it is especially suited for use in reducing the effects of adjacent channel interference to AM Monophonic and AM Stereo systems and will be particularly described in those connections.

There have been many procedures used in the past for reducing the effect of adjacent channel interference, including variable selectivity filters which are manually or automatically operated and audio or IF notch filters which are manually adjusted to sharply discriminate against interference. See, for example, page 517, 518 and 543, 544 K. R. Sturley, "Radio Receiver Design", second edition 1953, John Wiley & Sons, Inc., New York.

Also, there have been many types of systems developed for automatically altering the selectivity of receivers as a function of interference. The selectivity may be varied symmetrically or asymmetrically. Discussion of such systems is provided by Sturley on pages 543 and 544 of his book cited above. The variation in selectivity is provided at intermediate frequency as is the sensing system.

One object of the present invention is to provide inexpensive automatic means for reducing interference while maintaining relatively good frequency response.

A further object is to provide a method for reducing adjacent channel interference which is especially suitable for AM Stereo reception.

The invention also makes use of the so-called "cocktail party effect" to further discriminate against interference. The cocktail party effect is that effect that allows a binaural listener to separate speech arriving from two different talkers and pay more attention to one of the talkers.

A major object of the invention is to allow listeners of AM monophonic and stero signals to take advantage of the "cocktail party effect".

SUMMARY OF THE INVENTION

The present invention may be used in the reception of amplitude modulated waves, and is especially suitable for the reception of certain types of AM Stereo waves. The invention may, for example, be used to reduce adjacent channel interference in the reception of independent sideband (ISB) types of AM Stereo modulated waves by;
  (a) measuring the level of the received interference in the upper sideband stereo channel caused by the interfering channel contiguous to the upper sideband of the desired signal,
  (b) measuring the level of the received interference in the lower sideband stereo channel caused by the interfering channel contiguous to the lower sideband of the desired signal, and
  (c) automatically reducing the audio frequency response to the stereo channel suffering from the greater interference level, according to whether the (a) or (b) measurement is greater, when the level of the stronger interference level exceeds a predetermined level.

In many applications of the invention it is desirable to attenuate both the adjacent channel above and below the desired channel by a larger factor than when the system is operating free of substantial interference. However, it is desirable to provide greater attenuation for the adjacent channel suffering from the larger interference level.

The invention may also be used to improve the performance of monophonic receiving systems by allowing the listener to enjoy the use of the cocktail party effect. One method for improving the adjacent channel interference performance of receivers of monophonic double-sideband signals includes the steps of isolating and demodulating separately the upper and lower sideband of the desired signal and feeding the resulting audio waves to circuitry suitable for driving separate transducers. The transducers can be loudspeakers set up spacially as one would set up stereo loudspeakers; i.e., spaced some 4 to 6 feet apart. It is also possible to practice the invention by using stereo headphones as the transducers.

There are a number of ways of isolating and demodulating the upper and lower sideband channels, including phase shift type systems and filter type systems. Such techniques are well known to those skilled in the art. The system may be used with full carrier or double-sideband reduced carrier or suppressed carrier waves; i.e., with full carrier waves wherein the carrier level is less than the peak combined amplitude of the sidebands.

The monophonic application of the invention can also utilize means for measuring the level of the interference in the channels contiguous to the upper and lower sideband components of the desired signal and reducing the audio frequency response of the channel suffering from the greater interference level. Thus, the listener will not only be allowed to enjoy the improved interference reduction effects of the cocktail party effect but will also enjoy the improved selectivity of the system.

This invention is especially useful for receivers of independent sideband (ISB) type stereophonic signals where the stereo related information appears on the upper and lower sideband modulation of the carrier wave. In one such type of signal, the carrier is amplitude modulated by the stereo summation, L+R, intelligence and simultaneously phase modulated with the stereo difference, L-R, intelligence. Such a stereo wave is described in detail in U.S. Pat. Nos. 3,218,393 and 3,908,090 for example. The receivers for such a stereo wave can be designed to accentuate the cocktail party by providing special characteristics of the phase shift sideband separation device which would normally operate at intermediate frequencies and would be fed by a superheterodyne type circuit. The phase shift separation device, unlike a normal stereo receiver, would provide substantial separation for adjacent channel interference signal components falling above 5 KHz which is normally the acceptable high frequency range of stereo separated components. By connecting the output of the phase shift sideband separation device to means for separately amplifying the audio outputs of the sideband separation device, the interference components due to adjacent channel interference to one sideband can be caused to fall at one stereo loudspeaker and the adjacent channel interference to the other sideband would fall at the second stereo speaker. The desired stereo components would generally fall in between the two speakers as is normal for the stereo illusion.

In both stereophonic and monophonic reception, the reduction in audio frequency response should only be applied when the worst sideband channel interference is of sufficient amplitude to create listening problems. Generally, if the power level of the interference is less than one-tenth of a percent of the desired sideband power level it is unnecessary to reduce the audio frequency response. Typically, the response of the channel, or sideband, suffering from a stronger interference level is reduced to approximately one-third of the full response of the channel. For example, in medium quality stereo reception a 6 kHz audio response would be reduced to 2 kHz. For monophonic communications applications, the response would be reduced from 3 kHz to 1 kHz for example. The sideband suffering from less interference would be reduced by a lesser amount and for some applications of this invention the sideband receiving the weaker interference would not be altered in frequency response.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENT

Figure 1:
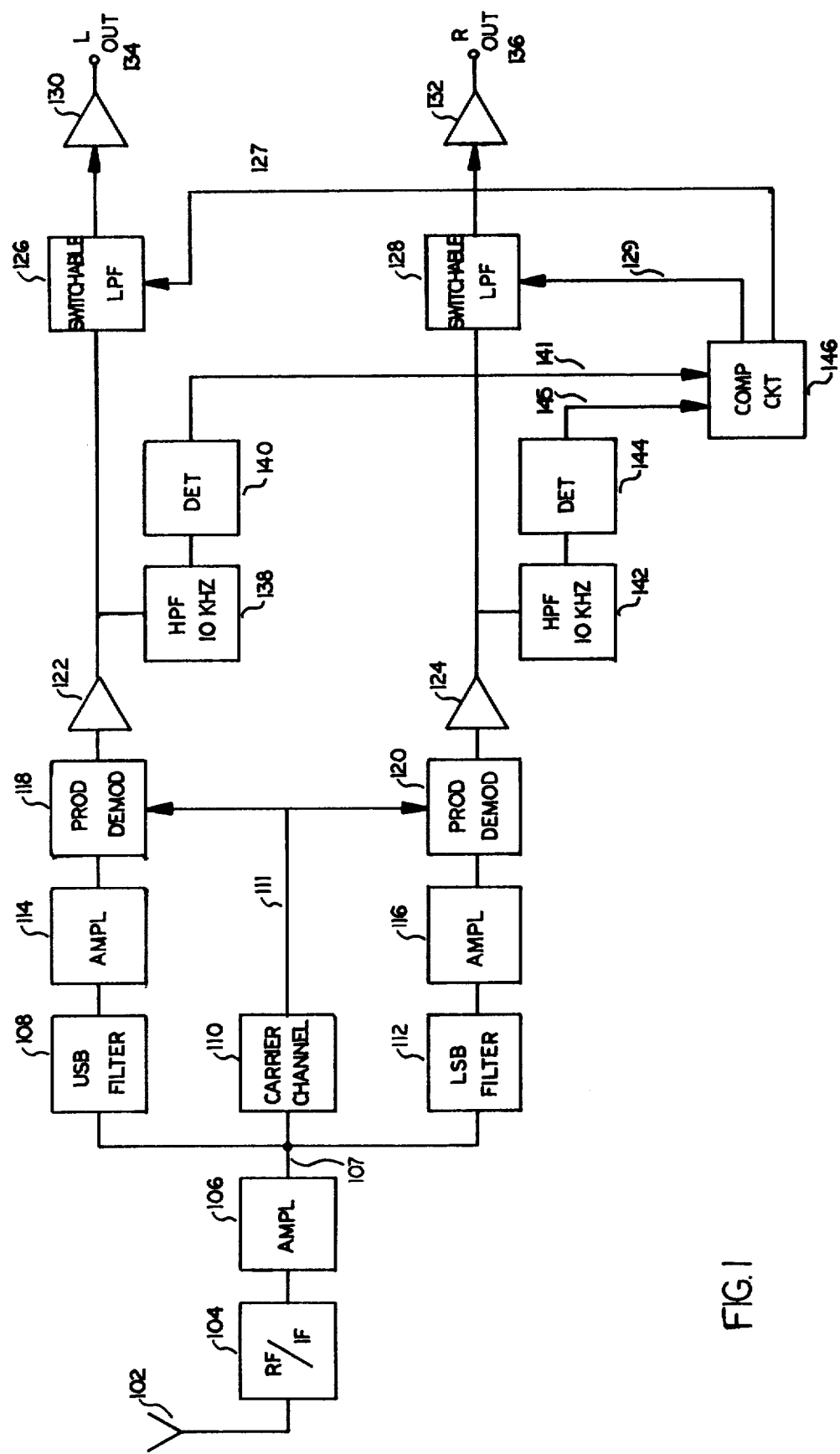
FIG. 1 is a block diagram of a typical receiving system constructed in accordance with the teachings of the present invention.

FIG. 1 is a block diagram of the receiver embodying the invention. This type of receiver may be used for the reception of certain forms of AM Stereo signals; i.e., independent sideband type (ISB) stereo signals wherein essentially the left band stereo channel information is transmitted via one sideband and the right band stereo channel information is transmitted via the other sideband. The circuit shown may also be used for the reception of monophonic signals. When used in the reception of monophonic signals, it, besides providing improved selectivity, has the added advantage over conventional AM monophonic reception of spatially separating interference from the desired signal.

The desired monophonic signal and many of the components of a stereo signal will appear to come from a point mid-way between the left and right loudspeakers. However, adjacent channel interference from a signal in a frequency band just above the desired channel will appear to come from a point to one side of the desired signal and interference from a signal in a frequency band just below the desired signal will appear to come from a point to the other side of the desired signal.

As mentioned above, this allows the listener to discriminate binaurally against the interference and to favor the desired signal. To understand how the system provides improved selectivity it is necessary to examine FIG. 1.

The antenna 102 is connected to the RF-IF superheterodyne circuit 104. The IF output of circuit 104 feeds amplifier 106, the output of which appears on line 107 and feeds three separate circuits: an upper sideband, a lower sideband, and a carrier channel circuit. The upper circuit is isolated by filter 108 which in turn feeds amplifier 114 which feeds product demodulator 118. The injection port of the product demodulator 118 is connected to the carrier channel 110 by line 111. The carrier channel is used to select the carrier signal and provide a clean carrier wave. One circuit which may be adapted for such service is described in U.S. Pat. No. 3,973,203.

There are a number of methods for isolating and demodulating the intelligence in the upper and lower sideband of a doublesideband wave, including the phase shift system in addition to the system shown in FIG. 1. An improved method of receiving ISB AM Stereo signals is described in detail in Patent Application 573,905 now U.S. Pat. No. 4,018,994.

Returning to the circuit in FIG. 1 of the present case, the lower sideband is selected by filter 112 which in turn feeds amplifier 116 which then feeds product demodulator 120. Product demodulator 120 is also fed by the output of carrier channel 110 through line 111. In one version of this system, product demodulators 118 and 120 may be replaced by envelope demodulators. Such an arrangement would also allow the elimination of carrier channel 110. However, for minimum distortion, and best signal-to-noise operation in fringe area locations, the circuit utilizing product demodulators as shown in FIG. 1 is superior. Also, if envelope demodulators are used without the carrier channel circuit, the upper and lower sideband filters would be required to pass the carrier component, complicating their specifications.

The output of product demodulator 118 feeds amplifier 122 and product demodulator 120 feeds amplifier 124. The output of amplifier 122 feeds highpass filter 138 which in turn feeds detector 140. Similarly, the output of amplifier 124 feeds highpass filter 142 which in turn feeds detector 144. The filters 138 and 142 and the detectors 140 and 144 are used to measure the level of the interference contiguous to the desired sidebands.

In present broadcast service, the carrier frequencies on the standard broadcast AM band in the United States are separated by 10 kHz. Filters 138 and 142 are used to isolate the adjacent channel interference signals. Therefore, filters 138 and 142 should pass 10 kHz waves with relatively little attenuation.

In order to conveniently sense the level of the adjacent channel carrier it is necessary that the filters in the RF and IF circuits 104 and the sideband filters 108 and 112 be sufficiently wide to pass signals displaced from the center or desired carrier frequency by at least ±10 kHz.

The output of detectors 140 and 144 are connected to comparison circuit 146 through lines 141 and 145. Comparison circuit 146 evaluates which of the detectors is producing a higher level wave. Thus, if detector 140 produces a larger output than detector 144 it can be assumed that interference to the upper sideband was greater than interference to the lower sideband. Comparison circuit 146 then, for example, would switch in a lower cutoff frequency adjustment of switchable lowpass filter 126. Conversely, if the output from detector 144 as appearing on line 145, produces a greater voltage than the voltage appearing on 141, it would be assumed that the interference to the lower sideband channel was greater and the switcheable lowpass filter 128 would switch to a lower cutoff frequency than filter 126.

The cutoff frequencies for filters 126 and 128 could be made a continuous function of the interference level or it then could jump in discrete steps. For example, the channel suffering from the large interference level might be set for a cutoff frequency of one-third of its normal full bandpass used when the channel is receiving a signal which is relatively free of interference. For communications service, the cutoff frequency might be 1 kHz. The filter of the sideband receiving lower amounts of interference may, in one embodiment of the invention be left at its full wideband characteristic or it might be reduced in bandwidth but by a lesser amount than the filter of the sideband which suffers from the stronger interference.

The reason it would be advantageous in certain situations to reduce the frequency response of both sidebands is that if either sideband is suffering from interference, it generally indicates that the desired signal is weak. Thus, reducing its bandwidth may help combat poor noise conditions.

The output of the switchable or controllable lowpass filters 126 and 128 feed individual amplifiers 130 and 132 which in turn feed, for example, the left hand transducer fed by the upper sideband and the right hand transducer fed by the lower sideband.

In typical applications of this equipment, the transducers would be conventional loudspeakers although stereo headphones may be used in many cases.

It should be noted that while FIG. 1 illustrates the use of the filter method of isolating sidebands, the invention is also applicable to the phase shift method of sideband selection. Phase shift type receivers are well known in the art and one technique based upon phase shift type sideband reception is disclosed in U.S. Pat. No. 4,018,994. In that patent a circuit especially suitable for compatible AM Stereo reception is shown. The circuit can be altered to provide the advantages of the new invention by taking the output as shown in FIG. 1 of that patent before the stereo signals are fed to loudspeaker 68 and 70 therein and feeding them to the circuitry shown in FIG. 1 of this specification connected to the outputs of amplifiers 122 and 124. Of course all of the circuitry shown in FIG. 1 of the instant case from the antenna 102 to the output terminals of amplifiers 122 and 124 would no longer be required and would be deleted as the stereo separation circuitry in FIG. 1 of U.S. Pat. No. 4,018,994 performs all of the necessary signal processing which is performed by the deleted blocks. It should be noted that the phase shift networks 68 and 60 of FIG. 1 of U.S. Pat. No. 4,018,994 must be altered in design so that at least a small amount of sideband suppression is provided at 10 kHz. While separation at this higher frequency is generally unnecessary for stereo reception, it is necessary for sensing the adjacent channel interference in the instant invention. Separation of higher frequenices is also necessary if the cocktail party effect is to be fully enjoyed.

As indicated above, conventional phase shift type SSB receivers as described in the literature may also be used with this invention for monophonic reception.

If the sideband isolated by filter 108 and demodulated by block 118 represents the upper sideband and the interference above the desired channel is greater than the interference below, signal filter 126 will be switched to a lower frequency cutoff, than filter 128 and the interference will be attenuated. It is also possible to continuously reduce the high frequency cutoff of the lowpass filter as a function of the interference rather than using a switcheable filter as shown in FIG. 1 below.

In another embodiment of the invention, both filters 126 and 128 are controlled by reducing their cutoff frequencies but the channel suffering from the greater amount of interference is provided with the lowest cutoff frequency.

Instead of utilizing highpass filters connected to the outputs of amplifiers 122 and 124, bandpass filters connected to the output of amplifier 106; i.e., in line 107 can be used. However, such filters, if they are to provide reasonable selectivity, would be somewhat more expensive than the filters shown in block form in FIG. 1; i.e., highpass filters 138 and 142.

The outputs of switchable lowpass filters 126 and 128 feed amplifiers 130 and 132 which feed transducer circuits. The transducers may be loudspeakers or stereo type headsets. When properly located loudspeakers (for example, in home installations four to six feet apart and in automobiles or other confined locations the speakers may be placed closer together) or when stereo type earphones are used in the reception of monophonic double-sideband signals with identical information in their upper and lower sidebands the "cocktail party effect" can be utilized to discriminate against adjacent channel interference. As an example, if the adjacent channel interference below the desired channel; i.e., the channel contiguous to the lower sideband of the desired signal, appears to the left of the listener, the adjacent channel interference above the desired channel; i.e., the channel contiguous to the upper sideband of the desired signal, appears to the right of the listener. The desired upper and lower sideband intelligence is fed in phase to the speaker producing an illusion of the desired signal coming from the center; i.e., half way between the speakers.

By this procedure, the listener is allowed to enjoy the so called "cocktail party effect" and discriminate against the inerfering signals which will seem to originate from a source located to the side of the listener.

The same effect is present to some degree in the above described AM Stereo embodiment of this invention. (Except the lower sideband interference would fall to the right of the listener and the upper to the left.) However, since the desired signal components do not all fall in the center but may appear at locations closer to the speakers, a lesser cocktail party effect advantage will be provided.

Figure 3:
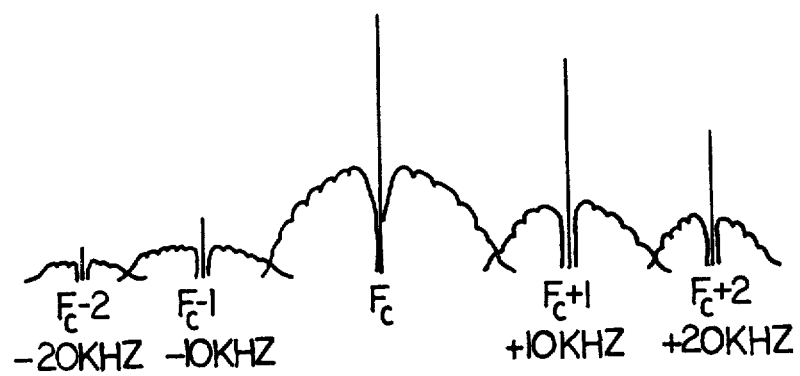
FIG. 3 is a sketch showing severe interference as one might see on a spectrum display device. An object of the present invention is to improve reception performance under this type of interference.

FIG. 3 shows a typical spectrum situation for a standard AM broadcast system wherein the desired carrier frequency is designated $F_c$. The adjacent channel 10 kHz above the desired carrier is designated at $F_c+1$. The 20 kHz upper adjacent channel carrier falls at $F_c+2$. Similarly, the lower frequency adjacent channels interfering signals have carrier frequencies at $F_c-1$ and $F_c-2$.

It should be noted that there is appreciable sideband overlap because most quality AM broadcast stations have sideband components apreciably higher than 5 kHz. The sideband components from the adjacent channel stations therefore can fall within the passband region of the desired signal. When they do, they can create a strange type of interference sometimes called "monkey chatter" which is unintelligible and quite annoying to listen to.

Thus, even if a receiver completely eliminates the carrier component of the adjacent channel interference, it can still suffer from interference from the sidebands of the adjacent channel signals. The present invention, by appreciably attenuating signals closer than 10 kc from the desired carrier not only helps remove the 10 kHz heterodyne whistle but also greatly attenuates the sideband interference or monkey chatter. In the example shown, in FIG. 3, the interference from the adjacent channel interfering signal above the carrier frequency is appreciably stronger than the interference from the lower sideband interfering wave. Therefore, it is important that the frequency response of the receiver be substantially reduced for its upper-sideband components. If the receiver was located at a point where its lower sideband would suffer from the higher amounts of interference it would be necessary to switch in additional selectivity for the lower sideband.

It is generally true, in the case of AM broadcast service, that the frequency assignments are made so that in a given area there is very little interference from adjacent channel signals spaced by 10 or 20 kHz from a given assigned station. However, if a listener tunes into a distant station there is a strong possibility that it will suffer from adjacent channel interference.

As pointed out above, the invention utilizes the so called cocktail party effect to enhance the adjacent channel interference rejection properties of receivers.

The realization of the cocktail party effect requires that the apparent location of the desired sound source be spatially separated from the apparent source of the interfering waves. Thus, it is important that the sideband separation for both the AM Stereo embodiment of this invention, and the monophonic embodiment be effective for all components falling within the effective high frequency limit of the audio passband. However, it is not as important that the separation be large for the low frequency section of the audio passband as adjacent channel interference components generally will not fall close to the desired signal's carrier. Therefore, in the monophonic embodiment, the circuitry providing separation of the sidebands need not be particularly effective, for, say, frequencies below 1 or 2 kHz. Thus, if the phase shift type system is used for separating the upper and lower sidebands, the networks do not have to accurately provide phase correction at the low frequency range and, accordingly, fewer circuit components are required.

In the case of AM Stereo, the separation is required for both stereo performance and for interference reduction. Therefore, the networks used for AM Stereo would require reasonable separation; say, down to at least 300 Hz.

Furthermore, in the development of the AM Stereo system, as described in U.S. Pat. Nos. 3,218,393, 3,908,090, 3,947,749 and 4,018,994, the phase shift networks utilized in the receiver provided reasonably good separation; i.e., 20 db or more from 200 Hz to 5,000 Hz. However, the overall monophonic frequency response of the receiver was somewhat greater; i.e., up to 10 kHz. The reason circuitry providing separation for the higher frequencies was not provided was that there is little stereo information provided by the high frequency sounds if sufficient information is located in the low and middle range for one to identify location. Therefore, because of economic and other reasons, the separation was limited to approximately 200 to 5,000 as above mentioned which approximately matched the separation characteristics of the stereo transmitter.

In the instant case, it is desirable to provide relatively good separation for the full high frequency response of the system so that the interference can be isolated and full use may be made of the cocktail party effect. However, the separation need not be very great for the listener to be able to discriminate against the interference. Generally, a 10 db separation figure is adequate.

Furthermore, if the embodiment of the invention incorporating additional filtering of the adjacent channel interference is utilized, the separation need only be sufficient for the system to measure the level of the interference wave. For example, where the equipment is used in systems where the carrier frequency of the adjacent channel interference is known, such as in standard AM broadcasting; i.e, 10 kHz from the desired carrier, it is only necessary that the separation be reasonable at 10 kHz. Thus, it is unnecessary to provide the full cocktail party effect for those frequency components which, if sufficiently strong to be disturbing, will be eliminated or at least greatly attenuated by the low-pass filtering as provided in FIG. 1 or FIG. 3. Actually, the network can be constructed so that the separation is poor, say above a few kilohertz, as long as it is restored at 10 kHz. This easing of specification can substantially reduce cost and complexity of the means for providing separation of the upper and lower sideband components.

For details as to the construction of phase shift networks see "Normalized Design of 90° Phase-Difference Networks" by S. D. Bedrosian in "IRE Transactions of the Professional Group on Circuit Theory", Vol. CP-7, No. 2, at pages 128–136 (June, 1960) and the bibliographical references therein.

Figure 2:
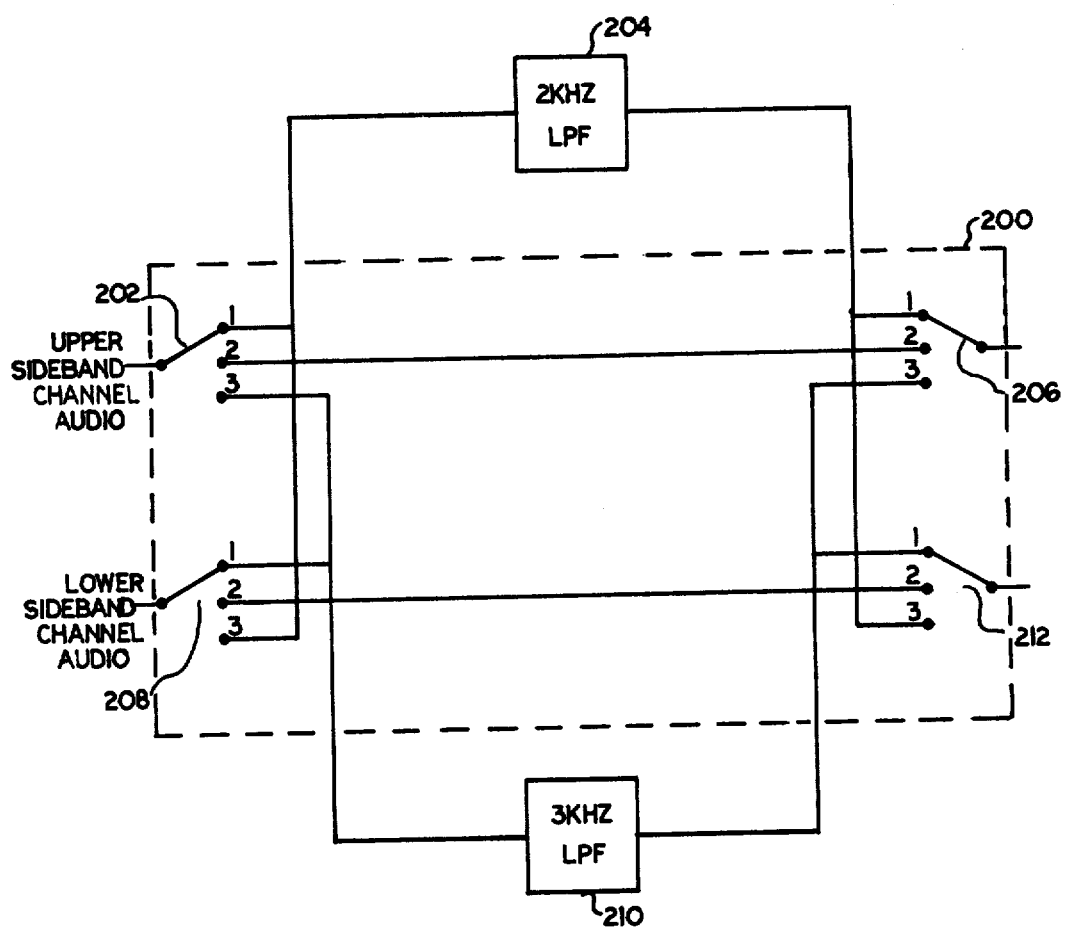
FIG. 2 is a schematic/block diagram of a switching arrangement for switching the lowpass filters into the upper and lower sideband channels to provide improved interference performance.

FIG. 2 shows a switching arrangement which may be used to provide the desired improved selectivity effect. Electronic switch 200, which is composed of sections 202, 206, 208 and 212 is used to change the frequency response of the system from full response (position 2) to reduce the upper sideband response to 2 kHz (position 1) and to reduce from full response (position 2) the lower sideband to 2 kHz (position 3). The switching circuit, if adapted to FIG. 1, would be controlled by comparison circuit 146 and would be used in lieu of filters 126 and 128. Switch section 208 and section 212 are used to change the frequency response of the system to the lower sideband intelligence. All the switch sections are "ganged" or connected so that they change positions in synchronism. In the position illustrated in FIG. 2 the upper sideband is restricted in frequency response to 2 kHz by lowpass filter 204 and the lower sideband to 3 kHz by lowpass filter 210. If the switches are controlled to the 3 position, as would be the case for severe interference to the lower sideband, the lower sideband is limited to 2 kHz response and the lower sideband to 3 kHz.

When interference is absent or low in level the switches would be controlled to operate in the 2 position switching the filters out of operation and providing maximum frequency response.

In some systems it may be desirable to switch in only one filter and allow the other sideband to operate with full response. Such a switching arrangement may readily be provided by altering the circuit of FIG. 2 by removing filter 210 and connecting the lead formerly going to the input of filter 210 to the lead formerly going to the output of filter 210.

It will be apparent to those skilled in the art that the audio filters 204 and 210 can be placed at a number of other points or that a combination of filters may be used to achieve the desired improved selectivity. The characteristics of the filter may be changed in discrete steps or may be continuous. As will be apparent to those skilled in the art, the filters may be of the passive type utilizing design procedure described in many texts; such as, Filter Design Data for Communication Engineers, J. H. Mole, John Wiley & Sons, Inc., New York, 1952. Also active audio filters may be used. The design procedure for active filters is shown in numerous texts; for example, Rapid Practical Designs of Active Filters, by D. E. Johnson and J. L. Hilburn, published by John Wiley & Sons, Inc., New York, 1975.

In all cases, it is understood that the above described arrangements are merely illustrative of the many possible specific embodiments which present applications of the present invention. Numerous and other varied arrangements can be readily devised in accordance with the principles of the present invention without departing from the spirit and scope of the invention.

What is claimed is:

1. The method of reducing interference in the reception of a monophonic double-sideband signal, said method comprising the steps of:
   separating upper and lower sideband components of the received signal;
   measuring the level of received interference in the upper sideband to produce a first measurement;
   measuring the level of received interference in the lower sideband to produce a second measurement; and
   automatically modifying the response to one sideband relative to the other to effectively reduce the response of the sideband suffering from the greater interference level according to whether the first or second measurement is greater.

2. The method of claim 1 wherein the step of modifying the response comprises reducing the audio frequency response of the sideband suffering from the greater interference level only when the level of the stronger interfering signal exceeds a predetermined level.

3. The method of claim 2 wherein the predetermined level is 0.1% of the desired sideband power level.

4. The method of claim 1 including the step of also reducing the audio frequency response of the sideband signal having the weaker interference level but by a factor not as great as the other sideband.

5. The method of claim 4 wherein the frequency response of the sideband suffering from the stronger interference level is reduced to approximately one-third the full response of the channel.

6. The method of claim 1 wherein the frequency response of the sideband suffering from the greater interference level is reduced to approximately 2 kHz.

7. The method of claim 1 wherein the frequency response of the sideband suffering from the greater interference level is reduced to approximately 2kHz and where the frequency response of the other sideband is reduced to approximately 3 kHz.

8. The method of improving the adjacent channel interference rejection performance of receivers in receiving a monophonic double-sideband signal, said method comprising:
   separately demodulating the upper sideband and lower sideband portions of the signal to produce first and second audio waves, respectively;
   measuring interfering signals in the upper sideband and lower sideband portions to produce correction signals according to the relative effects of the interfering signals on the respective sideband portions;
   feeding the audio waves to circuitry suitable for driving first and second transducers, respectively; and
   modifying one of the audio waves relative to the other by means of the correction signals to enhance the intelligibility of desired portions of the audio waves relative to the interfering signals.

9. The method of claim 8 wherein the received monophonic double-sideband signals are full-carrier amplitude-modulated waves.

10. The method of claim 8 wherein the carrier level of the monophonic double-sideband signals is less than the peak combined amplitude of the sidebands.

11. The method of improving the adjacent channel interference rejection performance of receivers in receiving monophonic double-sideband signals, said method comprising the steps of:
   isolating and demodulating the wave received in the upper sideband to produce a first audio wave;
   isolating and demodulating the wave received in the lower sideband to produce a second audio wave;
   measuring the level of the received interference in the channel contiguous to and above the upper sideband component of the desired signal;
   measuring the level of the received interference in the channel contiguous to and below the lower sideband component of the desired signal;
   reducing the audio frequency response to the sideband suffering from the greater measured interference level; and
   feeding the audio waves produced as a result of the above steps to circuitry suitable for driving separate transducers.

12. A receiver responsive to an amplitude-modulated double-sideband, monophonic signal centered on a carrier frequency, both of the sidebands of the signal containing substantially equal portions of a desired modulating signal, said receiver comprising:
   input means to receive signals in a frequency band including a selected monophonic signal and an interfering signal offset with respect to the carrier frequency of the signal;
   separation circuit means connected to receive signals from the input means and comprising first and second signal paths receiving lower and upper sideband portions, respectively, of the selected signal, one of the signal paths also receiving substantially more of the interfering signal than the other signal path receives;
   first demodulating means connected to the first signal path to demodulate signals therein to extract, as a first extracted signal, substantially the desired modulating signal;
   second demodulating means connected to the second signal path to demodulate signals therein to extract, as a second extracted signal, substantially the desired modulating signal, one of the extracted signals including the interfering signal in demodulated form;
   first transducer means connected to the first demodulating means to reproduce audible signals based on the first extracted signal;

second transducer means connected to the second demodulating means to reproduce audible signals based on the second extracted signal;

comparison circuit means to compare signals extracted by the first demodulating means with signals extracted by the second demodulating means; and control means connected to the comparison circuit means to be controlled thereby in response to the difference between the compared signals to modify one of the extracted signals relative to the other extracted signal to enhance the intelligibility of the audible signal based on the desired modulating signal portion of the first and second extracted signals relative to the interfering signal portion.

13. The receiver of claim 12 in which the control means comprises adjustable filter circuit means connected to the comparison circuit means to adjust the relative bandwidths of signals applied to the first and second transducer means.

14. The receiver of claim 13 in which the adjustable filter circuit means comprise:
   a first filter connected in the first signal path between the first demodulating means and the first transducer means; and
   a second filter connected in the second signal path between the second demodulating means and the second transducer means.

15. The receiver of claim 14 in which both of the filters comprise a first section and a second section having a narrower bandpass than the first section, and the control means comprises electronic switch means to switch either the first or second section into operative relationship in the respective signal path.

16. The receiver of claim 14 in which the control means comprises multi-throw electronic switch means comprising one throw to connect the first section in operative relationship with the both signal paths, simultaneously, a second throw to connect the second section in operative relationship with the first signal path and the first section in operative relationship with the second signal path, and a third throw to connect the first section in operative relationship with the first signal path and the second section in operative relationship with the second signal path.

17. The receiver of claim 13 in which the adjustable filter means comprises:
   first, second, and two third filter sections having, respectively, intermediate width, narrow and broad passbands; and
   multi-pole, multi-throw electronic switch means to connected either of the first and second filter sections in series with the first transducer means and simultaneously to connect the other of the first and second filter sections in series with the second transducer, or to connect one of the third filter sections in series with the first signal path and the other third filter section in series with the second signal path.

* * * * *